(12) United States Patent
Yang et al.

(10) Patent No.: US 12,405,357 B2
(45) Date of Patent: Sep. 2, 2025

(54) PULSED-COHERENT ELECTRONIC FRONT END FOR LIDAR AND RADAR DETECTION AND RANGING

(71) Applicant: The Regents of the University of California, Oakland, CA (US)

(72) Inventors: Chihkong Yang, Los Angeles, CA (US); Liyang Chen, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 813 days.

(21) Appl. No.: 17/597,459

(22) PCT Filed: Jul. 9, 2020

(86) PCT No.: PCT/US2020/041443
§ 371 (c)(1),
(2) Date: Jan. 6, 2022

(87) PCT Pub. No.: WO2021/007454
PCT Pub. Date: Jan. 14, 2021

(65) Prior Publication Data
US 2022/0252702 A1    Aug. 11, 2022

Related U.S. Application Data

(60) Provisional application No. 62/872,126, filed on Jul. 9, 2019.

(51) Int. Cl.
G01S 7/48 (2006.01)
G01S 7/4865 (2020.01)
G01S 17/14 (2020.01)

(52) U.S. Cl.
CPC ........... *G01S 7/4865* (2013.01); *G01S 17/14* (2020.01)

(58) Field of Classification Search
USPC ........................................................ 356/5.01
See application file for complete search history.

(56) References Cited

U.S. PATENT DOCUMENTS 7,202,941 B2 * 4/2007 Munro ................ G01S 17/10
356/5.1
7,388,655 B2 * 6/2008 Mori ..................... G01S 7/497
356/5.1

(Continued)

FOREIGN PATENT DOCUMENTS

WO     2021007454 A1     1/2021

OTHER PUBLICATIONS

International Preliminary Report on Patentability for International Application PCT/US2020/041443, Report issued Jan. 11, 2022, Mailed on Jan. 20, 2022, 06 Pgs.

(Continued)

*Primary Examiner* — James R Hulka
(74) *Attorney, Agent, or Firm* — KPPB LLP

(57) ABSTRACT

Systems and methods for a light detection and ranging (lidar) system utilizing both coherent and pulsed detection for Time of Flight (ToF) measurement are disclosed. In one embodiment, a lidar system includes a reference clock providing a clock signal ($CK_{ref}$) with time period $T_{clk}$, an automatic gain control (AGC) loop that is triggered when a received signal $RF_{in}$ is greater than a threshold voltage $V_{th}$, a coherent detector measuring a fine ToF by detecting the phase difference ($\Delta\phi$) between the clock signal ($CK_{ref}$) and the received signal ($RF_{in}$), a pulse edge detector measuring a coarse ToF by detecting a falling edge (post-edge) of the received signal ($RF_{in}$) and counting cycles N to estimate an arrival time of $N \times T_{clk}$, and a combiner that calculates total ToF by combining output of the coherent detector and pulse edge detector using the equation:

(Continued)

$$ToF = \left[N + \left(\frac{\Delta\Phi}{2\pi}\right)\right] \times T_{clk}.$$

16 Claims, 14 Drawing Sheets

(56) References Cited

U.S. PATENT DOCUMENTS

| | | | |
|---|---|---|---|
| 8,558,993 | B2 | 10/2013 | Newbury et al. |
| 9,515,859 | B2* | 12/2016 | McCormack ..... H01L 23/49861 |
| 10,211,592 | B1 | 2/2019 | Villeneuve et al. |
| 10,732,264 | B2* | 8/2020 | Bailey .................. G01S 7/4816 |
| 11,255,663 | B2* | 2/2022 | Binder .................. G01B 15/00 |
| 11,722,141 | B1* | 8/2023 | Filippini ............... H03L 7/0812 |
| | | | 327/158 |
| 11,726,184 | B2* | 8/2023 | Ferreira ................ G01S 7/4815 |
| | | | 356/4.01 |
| 11,906,290 | B2* | 2/2024 | Binder .................. G01B 11/26 |
| 2004/0135992 | A1* | 7/2004 | Munro .................... G01S 7/483 |
| | | | 356/4.01 |
| 2008/0088818 | A1 | 4/2008 | Mori |
| 2008/0100822 | A1* | 5/2008 | Munro .................... G01S 7/483 |
| | | | 356/28 |
| 2011/0285980 | A1* | 11/2011 | Newbury ................ G01S 7/484 |
| | | | 356/3 |
| 2014/0355700 | A1 | 12/2014 | Mccormack et al. |
| 2019/0154439 | A1* | 5/2019 | Binder .................. G01S 15/08 |
| 2019/0170859 | A1 | 6/2019 | Bailey et al. |
| 2020/0284883 | A1* | 9/2020 | Ferreira .................. G01S 17/10 |
| 2022/0128352 | A1* | 4/2022 | Binder .................. G01B 15/00 |
| 2024/0159522 | A1* | 5/2024 | Binder .................. G01B 11/26 |
| 2024/0175678 | A1* | 5/2024 | Binder .................. G01S 15/42 |

OTHER PUBLICATIONS

International Search Report and Written Opinion for International Application No. PCT/US2020/041443, Search completed Sep. 21, 2020, Mailed Oct. 9, 2020, 14 Pgs.

Andersen et al., "A 118-mW 23.3-GS/s dual-band 7.3-GHz and 8.7-GHz impulse-based direct RF sampling radar SoC in 55-nm CMOS", 2017 IEEE International Solid-State Circuits Conference (ISSCC), Feb. 5-9, 2017, San Francisco, CA, USA, pp. 138-139, DOI: 10.1109/ISSCC.2017.7870299.

Behroozpour et al., "Chip-scale electro-optical 3D Fmcw lidar with 8μm ranging precision", 2016 IEEE International Solid-State Circuits Conference (ISSCC), Jan. 31-Feb. 4, 2016, San Francisco, CA, USA, pp. 214-216, DOI: 10.1109/ISSCC.2016.7417983.

Chen et al., "A 19-GHz Pulsed-Coherent ToF Receiver With 40-μm Precision for Laser Ranging Systems", In ESSCIRC 2019-IEEE 45th European Solid State Circuits Conference (ESSCIRC), Sep. 23, 2019, pp. 191-194 [online], [retrieved on Sep. 11, 2020]. Retrieved from the Internet <URL: https://ieeexplore.IEEE.org/abstract/document/8902597>, entire document.

Ellinger et al., "Analysis and Compensation of Phase Variations Versus Gain in Amplifiers Verified by SiGe HBT Cascode RFIC", IEEE Transactions on Microwave Theory and Techniques, Aug. 2009, First Published: Jul. 6, 2009, vol. 57, No. 8, pp. 1885-1894, DOI: 10.1109/TMTT.2009.2025415.

Hafez et al., "Analysis and Design of Superharmonic Injection-Locked Multipath Ring Oscillators", IEEE Transactions on Circuits and Systems I: Regular Papers, Jul. 2013, First Published: Jan. 25, 2013, vol. 60, No. 7, pp. 1712-1725, DOI: 10.1109/TCSI.2012.2230591.

Huang et al., "Mode-Locked Ultrashort Pulse Generation from On-Chip Normal Dispersion Microresonators", Physical Review Letters, Feb. 6, 2015, vol. 114, p. 053901-1-053901-5, doi: 10.1103/PhysRevLett.114.053901.

Kim et al., "A High Noise Immunity, 28 X 16-Channel Finger Touch Sensing IC Using OFDM and Frequency Translation Technique", Sensors, vol. 18, No. 5, May 21, 2018, p. 1652 (online], [retrieved on Sep. 11, 2020]. Retrieved from the Internet <URL: https://www.mdpi.com/1424-8220/18/5/1652>, entire document.

Nissinen et al., "Integrated Receiver Including Both Receiver Channel and TDC for a Pulsed Time-of-Flight Laser Rangefinder With cm-Level Accuracy", IEEE Journal of Solid-State Circuits, May 2009, vol. 44, No. 5, pp. 1486-1497, DOI: 10.1109/JSSC.2009.2017006.

Payne et al., "A 512×424 CMOS 3D Time-of-Flight image sensor with multi-frequency photo-demodulation up to 130MHz and 2GS/s ADC", 2014 IEEE International Solid-State Circuits Conference Digest of Technical Papers (ISSCC), Feb. 9-13, 2014, San Francisco, CA, USA, pp. 134-135, DOI: 10.1109/ISSCC.2014.6757370.

Yasutomi et al., "A 0.3mm-resolution Time-of-Flight CMOS range imager with column-gating clock-skew calibration", 2014 IEEE International Solid-State Circuits Conference Digest of Technical Papers (ISSCC), Feb. 9-13, 2014, San Francisco, CA, USA, pp. 132-133, DOI: 10.1109/ISSCC.2014.6757369.

Zhu et al., "Synthetic-wavelength-based dual-comb interferometry for fast and precise absolute distance measurement", Optics Express, 2018, vol. 26, No. 5, pp. 5747-5757, https://doi.org/10.1364/OE.26.005747.

* cited by examiner

| | 2009 [3] | 2014 [8] | 2014 [4] | 2016 [2] | 2017 [9] | 2018 [1] | Proposed |
|---|---|---|---|---|---|---|---|
| Detection | Pulsed Lidar | Pulsed Lidar | Coherent Lidar | FMCW Lidar | Pulsed Radar | Coherent Lidar | Pulsed-coherent |
| Technology | 130nm CMOS | 110nm CMOS | 130nm CMOS | 180nm CMOS | 55nm CMOS | N/A | 28nm CMOS |
| Area | 1.3×1.3mm² | N/A | 8.2×14.2mm² | 3×3mm² | 3.3×2.6mm² | N/A | 1.2×1.2mm² |
| Carrier Freq. | N/A | N/A | 130MHz | N/A | 8.7GHz | 56.09MHz | 19GHz |
| Power Consumption | 45mW | N/A | 2.1W | 73.56mW | 118mW | N/A | 121mW |
| Building Blocks | TIA, TDC | Pixel array, TDC | Pixel array, Amps, ADCs, Clock drivers, Shutter engine | EO-PLL circuitry (TIA, Integrator, Laser driver) | Tx, 243MHz PLL, LNA, Pre-Amp, Sampler | N/A | PI-VGLNA, PGA, VGA, I/Q mixer, Dividers, Sampler, DMUX |
| Depth Precision. (rms error) | 8000μm @best case 38000μm @SNR=20dB | 300μm | 2000μm @best case 10000μm @3.5m | 8μm @best case 4200μm @1.4m | 1200μm | 1.2μm | 25μm @best case*** 40μm @SNR=12dB |
| Distance | 10m | 32mm | 0.8-4.2m | 1.4m | 9m | 2.67m | SNR-based**** |
| Dynamic Range | 80dB | N/A | 68dB | N/A | N/A | N/A | 60dB |
| Sampling Rate | 10MSa/s | 76Sa/s** | 82Sa/s** | 180kSa/s | 10kSa/s | 2kSa/s | 1MSa/s |

* Distance away from the baseline.  Calculated from integration time per pixel. * Theoretical precision based on the timing accuracy.
**** The range can be increased by adding more bits to the counter with sufficient input sensitivity.

*Table I*

PULSED-COHERENT ELECTRONIC FRONT END FOR LIDAR AND RADAR DETECTION AND RANGING

CROSS REFERENCE TO RELATED APPLICATIONS

The current application is a national stage of PCT Patent Application No. PCT/US2020/041443 entitled "Pulsed-Coherent Electronic Front End for Lidar and Radar Detection and Ranging" filed Jul. 9, 2020, which claims the benefit of U.S. Provisional Patent Application No. 62/872,126 entitled "Pulsed-Coherent Electronic Front End for Detection and Ranging" filed Jul. 9, 2019, the disclosures of which are incorporated herein by reference in their entirety.

BACKGROUND

Lidar (Light Detection and Ranging) and radar are methods for distance ranging by measuring the time-of-flight (ToF) of light or radio-waves. In lidar, the target is typically illuminated with laser light and the reflection is measured with a sensor. Differences in laser return times and wave characteristics can then be used to construct a distance and/or location of the target. Modern applications of lidar and radar systems include self-driving automobiles and autonomous robots.

Three main detection methods are used in ranging systems. The first is coherent detection (also known as interferometry), which can achieve high resolution but has slow acquisition due to the range ambiguity. Coherent detection generally measures changes in phase of the reflected light. The second, frequency-modulated continuous-wave (FMCW) detection, sets up a laser to emit linear optical frequency chirps. This has both moderate resolution and acquisition but narrow dynamic range. The third and the last, pulsed detection, emits short pulses or pulse patterns from the sensor aperture and the power of back-reflected light is detected using a square-law photodetector. This has low resolution limited by timing offsets commonly referred to as "walk error", but it has the advantages of fast acquisition and long-distance measurement. Demand for ranging systems with high depth resolution and fast acquisition has emerged for various applications such as mobile 3D scanning and remote biometrics, but, as state-of-the-art systems show (FIG. 1), simultaneously satisfying both requirements can be challenging.

SUMMARY OF THE INVENTION

Systems and methods for a light detection and ranging (lidar) system utilizing both coherent and pulsed detection for Time of Flight (ToF) measurement are disclosed. In one embodiment, a lidar system includes a reference clock providing a clock signal ($CK_{ref}$) with time period $T_{clk}$, an automatic gain control (AGC) loop that is triggered when a received signal $RF_{in}$ is greater than a threshold voltage $V_{th}$, a coherent detector configured to measure a fine ToF by detecting the phase difference ($\Delta\phi$) between the clock signal ($CK_{ref}$) and the received signal ($RF_{in}$), a pulse edge detector configured to measure a coarse ToF by detecting a falling edge (post-edge) of the received signal ($RF_{in}$) and counting cycles N to estimate an arrival time of $N \times T_{clk}$, a combiner configured to calculate total ToF by combining output of the coherent detector and pulse edge detector using the equation, $$ToF = \left[N + \left(\frac{\Delta\Phi}{2\pi}\right)\right] \times T_{clk}.$$

In another embodiment, the AGC loop includes a folded-cascode amplifier as a V/I converter.

In a further embodiment, the coherent detector includes two single-side band (SSB) mixers.

A still another embodiment includes a variable gain analog front-end to control amplitude of the received signal ($RF_{in}$).

In a yet further embodiment, the variable gain analog front-end comprises a phase-invariant variable-gain low-noise amplifier (PI-VGLNA), in-phase and quadrature phase (I/Q) down-conversion mixer, programmable gain amplifier (PGA) and variable gain amplifier (VGA).

In another further embodiment, the PI-VGLNA comprises a current-steering cascode architecture with inductors between common source and common gain stages.

In an additional embodiment, the PGA and VGA comprise current-steering structures controlled by single-to-differential V/I converters.

In another additional embodiment, the pulse edge detector comprises varactors adjusted according to voltage $V_{ctrl}$ of the AGC loop, 8-way time-interleaved samplers, an 8-to-16 demultiplexer, and XOR gates.

In a still further embodiment, a method for measuring distance with a light detection and ranging (lidar) system utilizing both coherent and pulsed detection for Time of Flight (ToF) includes providing a clock signal ($CK_{ref}$) with time period $T_{clk}$ from a reference clock, triggering an automatic gain control (AGC) loop when a received signal $RF_{in}$ is greater than a threshold voltage $V_{th}$, measuring a fine ToF using a coherent detector by detecting the phase difference ($\Delta\phi$) between the clock signal ($CK_{ref}$) and the received signal ($RF_{in}$), measuring a coarse ToF using a pulse edge detector by detecting a falling edge (post-edge) of the received signal ($RF_{in}$) and counting cycles N to estimate an arrival time of $N \times T_{clk}$, and calculating total ToF by combining output of the coherent detector and pulse edge detector using the equation:

$$ToF = \left[N\left(\frac{\Delta\phi}{2\pi}\right)\right] \times T_{clk}.$$

Another embodiment also includes controlling amplitude of the received signal ($RF_{in}$) using a variable gain analog front-end.

DETAILED DISCLOSURE OF THE INVENTION

Figure 1:
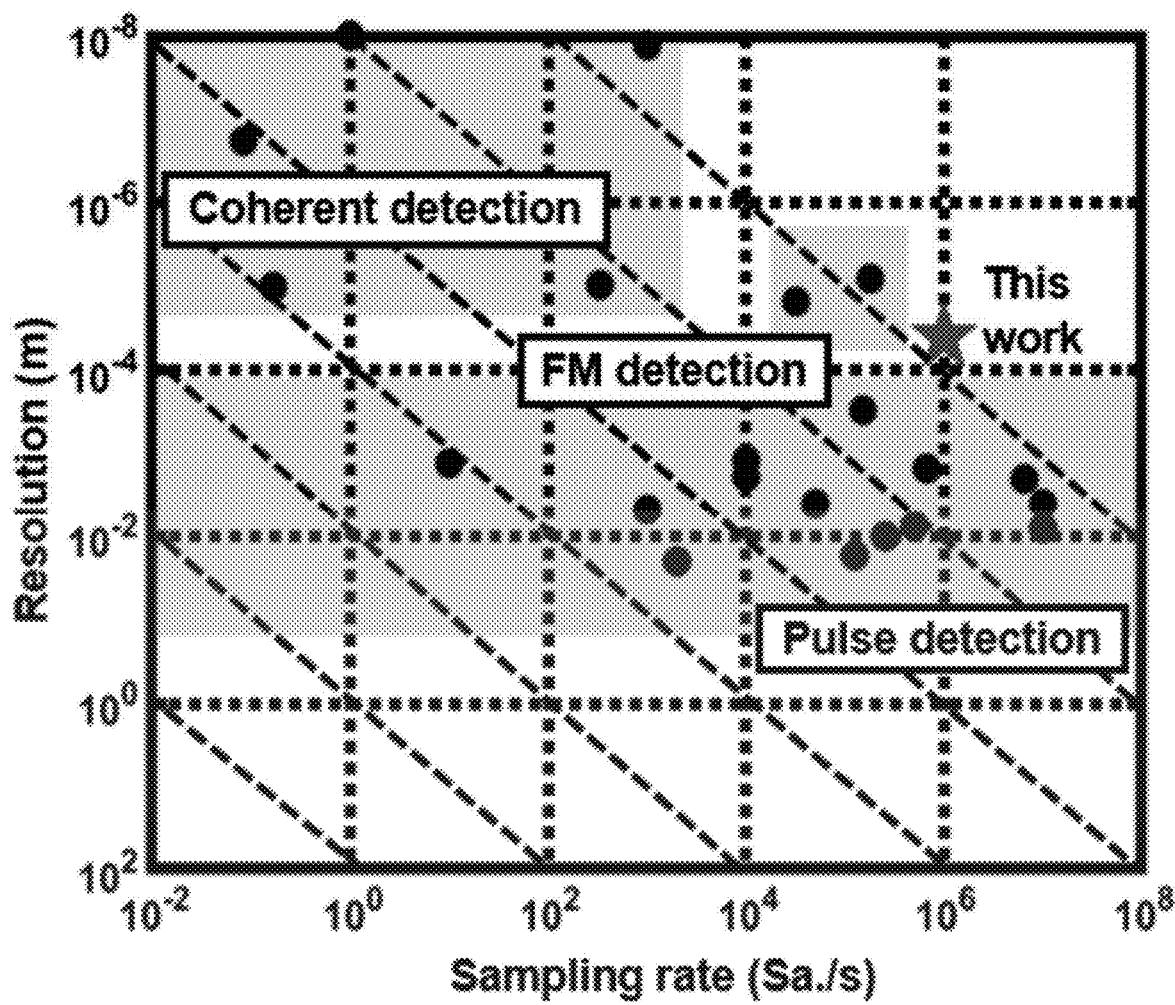
FIG. 1 graphically illustrates capabilities of different types of ranging detection in resolution vs. sampling rate.

Turning now to the drawings, pulsed-coherent electronic front ends for lidar and radar detection and ranging in accordance with embodiments of the invention are disclosed. For conventional coherent detection to achieve sub-mm resolution with 10-m dynamic range without ambiguity (covered within one period of the signal), it requires 17-bits of resolution for the analog-to-digital converter (ADC) or time-to-digital converter (TDC) to acquire phase information. Segmented measurements with frequency sweeping or dual frequency combs can be used to ease this requirement on the ADC. The acquisition is usually slow due to the scanning behavior, and furthermore, the search time for the coarse measurement increases dramatically for long-distance ranging.

In many embodiments of the invention, pulsed-coherent segmented time-of-flight (ToF) measurement is utilized to enhance the sampling rate, which leverages the high resolution of coherent detection and the fast acquisition of pulsed detection. Pulsed detector circuitry may be utilized for a coarse ToF measurement, while coherent detector circuitry may be utilized for a fine ToF measurement. The coarse and fine ToF measurements can then be combined to generate a total ToF measurement.

In one embodiment, a pulsed-coherent lidar system is designed with a 19-GHz carrier frequency which fits with a 19-GHz repetition rate ultra-low jitter mode-locked laser (MLL) to enable further lidar system integration. Using a high carrier frequency eases the requirements of the ADC's resolution for coherent detection. A 9-bit medium resolution ADC is sufficient for resolution in the tens of microns with a 19-GHz carrier. To break the tradeoff between the precision and the acquisition rates, this 19-GHz carrier can be modulated with 6.8-ns pulses, and the arrival time of the pulse's envelope can be measured by a 19-GHz counter as the coarse measurement. This approach also provides a capability of high dynamic measurement range. With sufficient sensitivity of the front-end, the acquisition range can be linearly increased by adding more bits to the counter. There can be two challenges with this pulsed-coherent approach that are each addressed below. First, the walk error of the envelope pulse detection can easily be larger than a 19-GHz period, thus limiting the resolution. Second, linearity is important in a coherent receiver to maintain fine phase information. Using a variable gain amplifier (VGA) can increase the dynamic range, but phase variation may be introduced. As will be described below in accordance with certain embodiments of the invention, post-edge pulsed detection can be utilized to suppress walk error within a clock period, and a phase-invariant variable gain analog front-end (AFE) to minimize the phase variation. One skilled in the art will recognize that characteristics, such as carrier frequencies and pulse durations, of a system or method performing such measurements may be different in additional embodiments as appropriate to a particular application.

The disclosure of the present application includes at least three main concepts. First, combining pulsed based detection and ranging commonly used in long distance LiDARs with coherent detection is often used for very high measurement accuracy over short distances. This approach enables one to dynamically tradeoff the resolution and sampling rate (of a LiDAR measurement) benefitting from the multiple measurement and improved noise of coherent detection (for fine measurement) and the speed of the pulsed detection (for coarse measurement).

Second, walk error is a well-known problem that introduces detection error for varying input signal amplitude. This issue can be addressed with the use of a pulsed-coherent architecture in accordance with embodiments of the invention. When the pulse is used only for coarse signal detection, a ranging system in accordance with several embodiments can tolerate a larger amount of error as long as the error is within the fine detection range.

Third, post-edge detection is introduced as a way to dramatically reduce walk error. An input signal for detection is typically amplified using a variable gain amplifier (VGA). The amplifier is designed to provide a constant output amplitude regardless of the input amplitude. First, digital programmability is introduced to the VGA to have constant delay so that it does not introduce any measurement error. Second, since the VGA has constant output amplitude, the falling edge (post-edge) of the pulse does not vary with input amplitude and hence does not suffer substantially from walk error.

An architecture in accordance with many embodiments of the invention allows for multiple pulses to allow for more averaging and hence improved noise performance. Each group of pulses (at an intermediate frequency as compared to the high frequency of the fine coherent detection) can be repeated at a lower frequency hence creating yet another layer of hierarchy for multiple coherent detection. This approach enables not only fine and coarse detection but introduces an intermediate detection resolution for even larger range of detection.

Pulsed-Coherent Detection

In many embodiments of the invention, the received signal initiates an automatic gain control (AGC) loop when it crosses the threshold voltage ($V_{th}$) of a signal detector. After the loop is settled, fine ToF is measured by coherent detection, which detects the phase difference ($\Delta\phi$) between the reference clock ($CK_{ref}$) and the received signal ($RF_{in}$). Instead of observing the rising edge of the envelope, it can measure the falling edge (post-edge) as coarse ToF measurement. The arrival time of the envelope can be measured by using the reference clock ($N \times T_{clk}$), where N is the number of cycles (periods) and $T_{clk}$ is the time duration of one cycle (period) of the reference clock. Combining measured coarse ToF and fine ToF measurement results, the total ToF can be calculated as equation (1) below:

$$ToF = \left[N + \left(\frac{\Delta\Phi}{2\pi}\right)\right] \times T_{clk} \quad (1)$$

To overcome the range ambiguity, the coarse measurement has a detection precision within a clock period ($T_{clk}$) and the coherent detection provides the fine ToF measurement within the cycle.

Figure 2A:
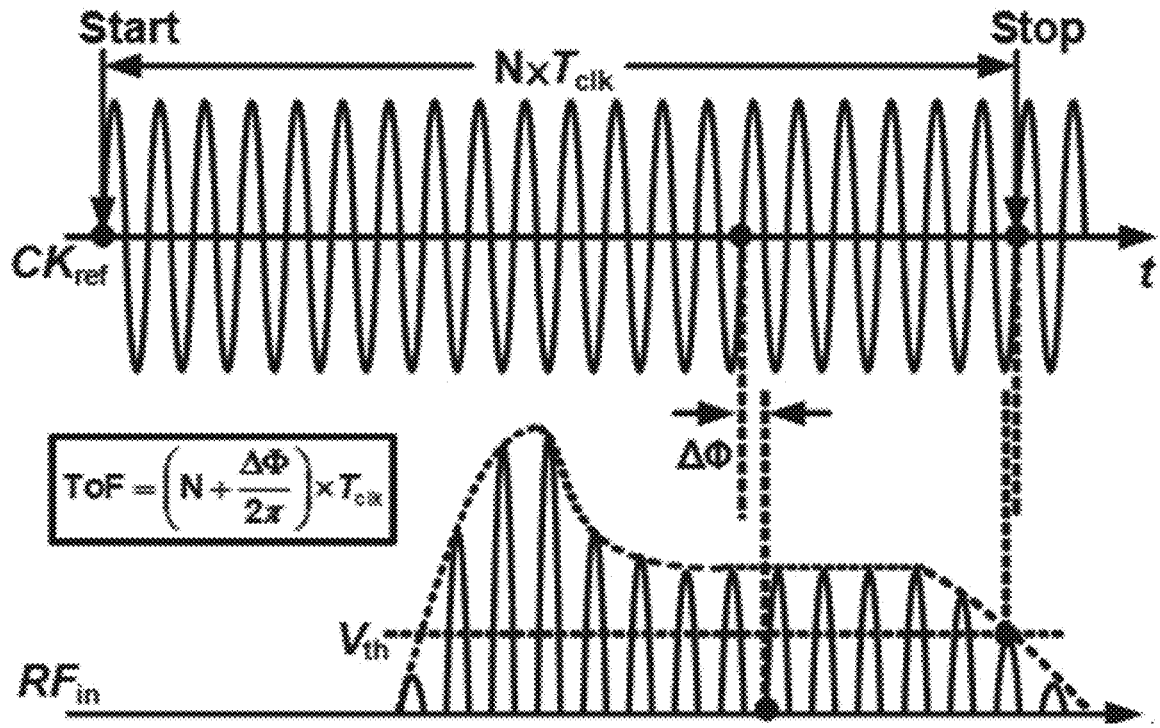
FIG. 2A illustrates an example waveform that may be utilized for measurements in pulsed-coherent range detection in accordance with several embodiments of the invention.
Figure 2B:
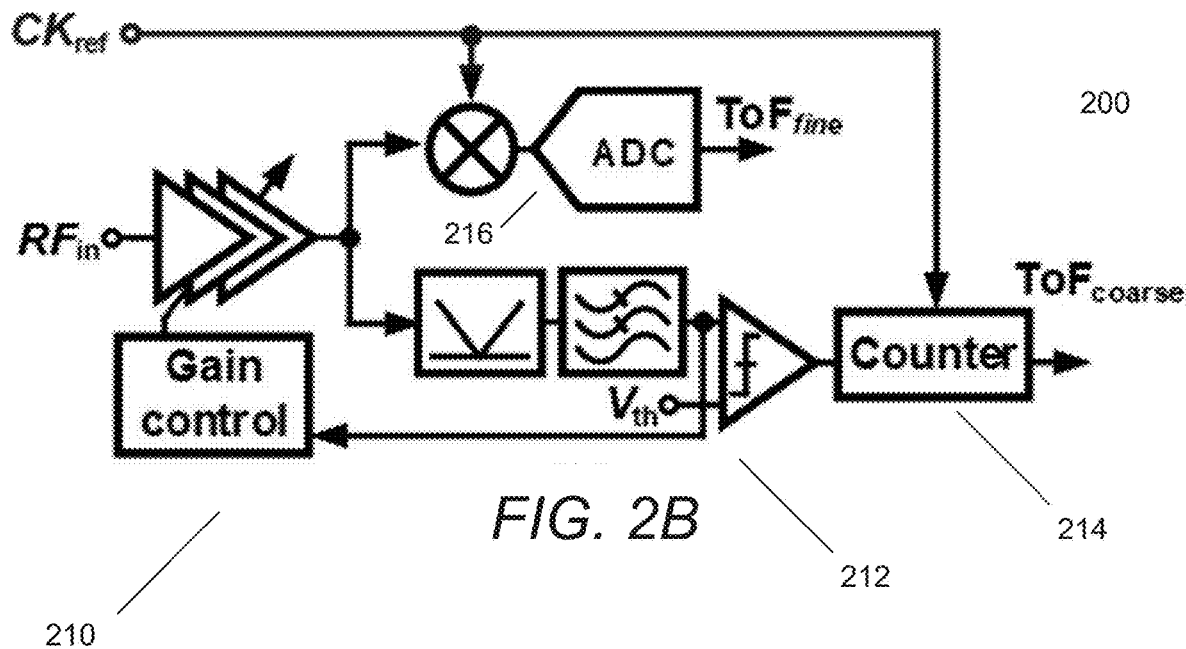
FIG. 2B is a circuit diagram illustrating a pulsed-coherent range detector in accordance with several embodiments of the invention.

A block diagram is shown in FIG. 2B to illustrate the components of a pulsed-coherent lidar system 200 in accordance with several embodiments of the invention. A variable gain analog front-end (AFE) 210 accurately controls the amplitude of the received signals. Since the amplitude is constant for a post-edge, the coarse measurement is no longer susceptible to the walk error due to varying measured rising edge of the variable amplitude inputs. This variable gain AFE (VGA) further helps reduce complexity and maintain linearity toward accurate fine detection. To measure the envelope's post-edge, the VGA output is fed to a power detector 212 prior to the counter 214. The coherent fine phase is measured by a phase detector and an ADC 216. The pulsed sequence can be repeated to do more averaging or be modulated by a data sequence as an identifier. In addition, the pulsed-coherent architecture can be further segmented to improve sensitivity, measurement distance, or depth resolution. Although a specific architecture is discussed with respect to FIG. 2B, one skilled in the art will recognize that any of a variety of architectures may be utilized in accordance with embodiments of the invention. Different components may be used to similar effect as discussed here.

Receiver Architecture

Figure 3:
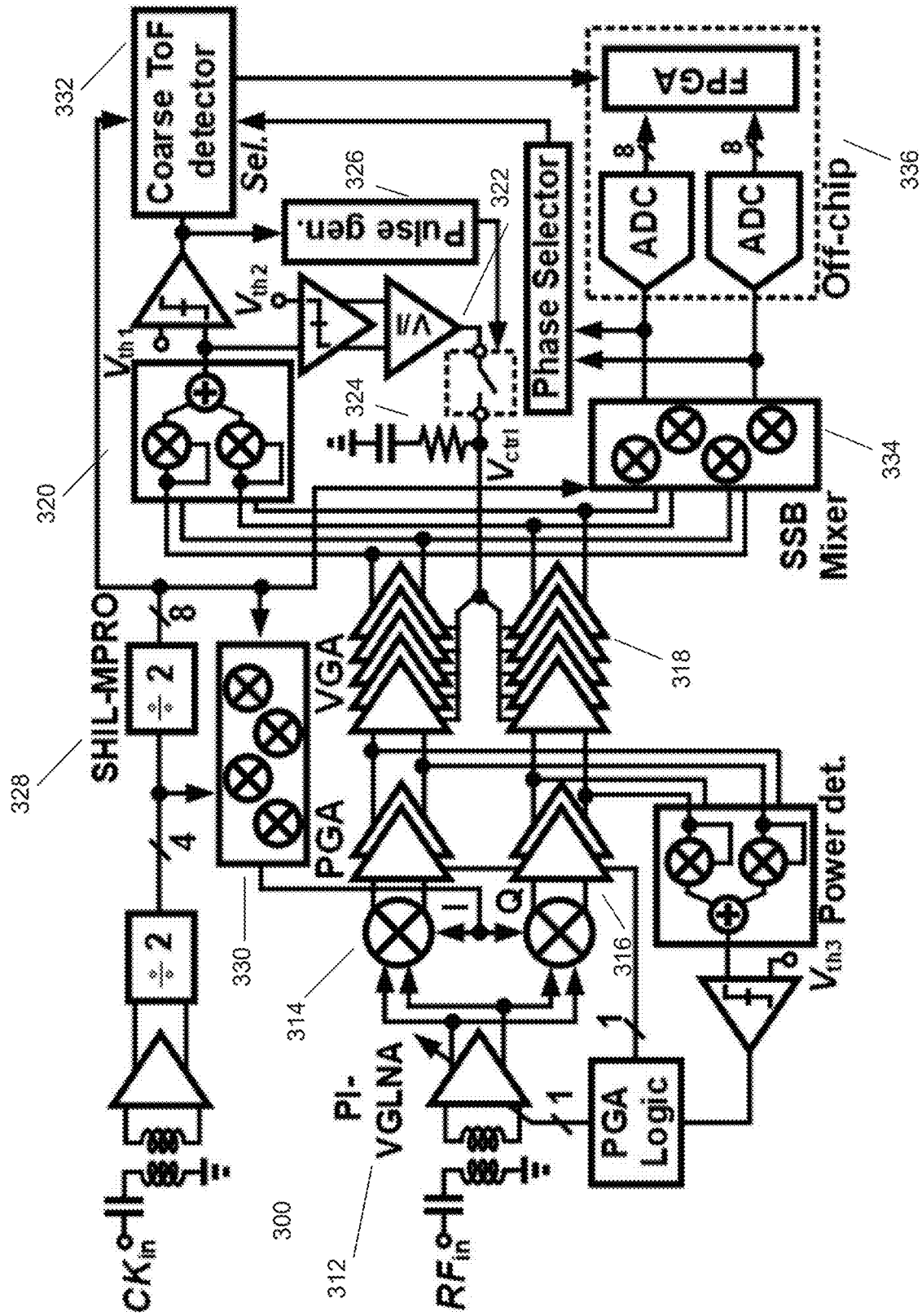
FIG. 3 is a circuit diagram illustrating a receiver architecture for pulsed-coherent range detection in accordance with several embodiments of the invention.

A receiver architecture 300 in accordance with several embodiments of the invention is shown in FIG. 3. An AFE provides 60-dB dynamic range, which includes 1-bit phase-invariant variable-gain low-noise amplifier (PI-VGLNA) 312, in-phase and quadrature-phase (I/O) down-conversion mixer 314, 1-bit programmable gain amplifier (PGA) 316, and a VGA 318 with a continuous AGC loop. Each amplifier provides 20-dB gain tuning range. For the digital control of the PI-VGLNA 312 and PGA 316, a self-mixing power detector 320 after the PGA senses the input power and sets the coarse gain settings. For the continuous AGC loop, a V/I converter 322 implemented by a folded-cascode amplifier provides high gain and high output impedance. A frequency zero can be introduced in the loop filter with 250-MHz loop bandwidth to achieve fast transient response by a series R-C lowpass filter 324. A pulse generator 326 after signal detector provides a 4-ns settling window for the AGC loop. A track-and-hold switch can hold the control-voltage of the VGAs, and release it after detecting the envelope's falling edge. In the clock generation path, a portion of the power can be split from a continuous 19-GHz source and the clock divided to provide 14.25-GHz and 4.75-GHz LOs (local oscillators) for down conversion and fine ToF detection. A superharmonic injection locked multipath ring oscillator (SHIL-MPRO) 328 and up-conversion mixers 330 can provide I/O LOs. The coarse ToF detector 332 can take the output from a self-mixing power detector 320 and a signal detector to find the envelope's post-edge transition. For fine ToF detection, two single-side band mixers (SSB Mixer) 334 can act as a coherent detector. In this architecture, an off-chip ADC 336 may be used to read out the results. While a specific architecture is described above with respect to FIG. 3, one skilled in the art will recognize that any of a variety of architectures may be utilized in accordance with embodiments of the invention. Different components may be used to similar effect as discussed here.

Phase-Invariant Variable Gain Amplifiers

Figures 4A, 4B:
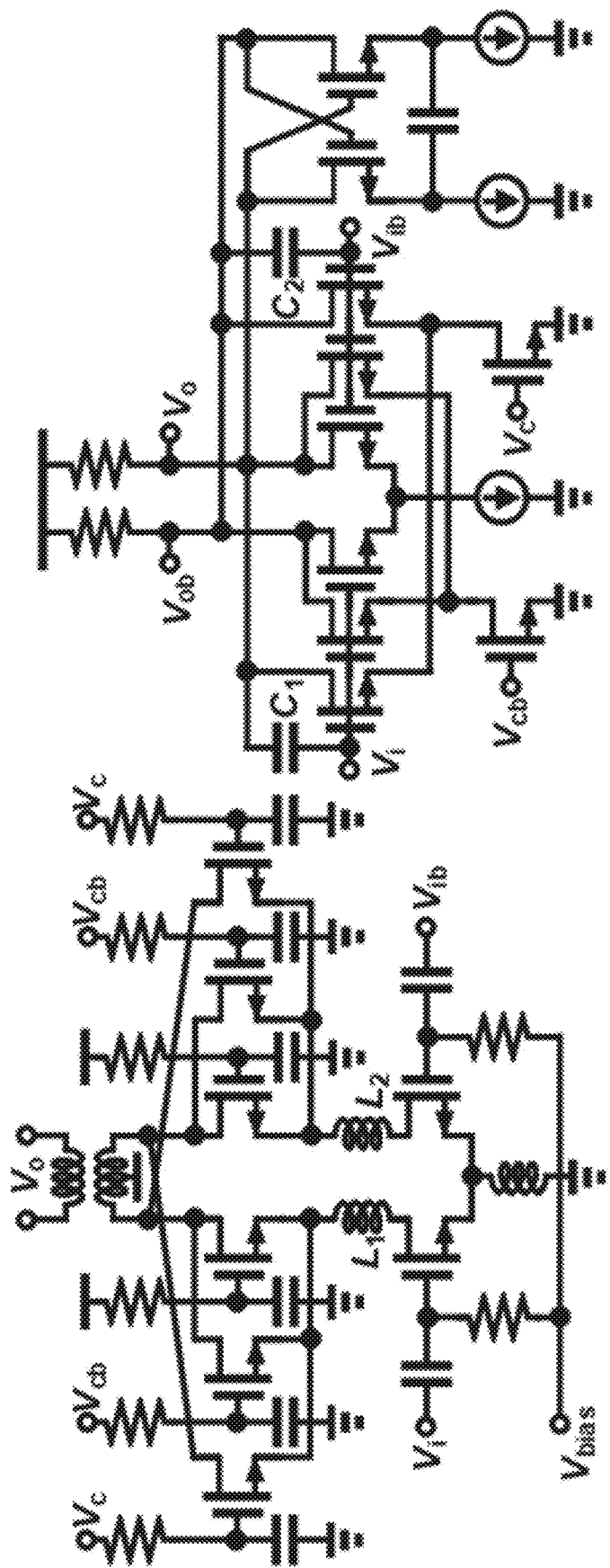
FIG. 4A is a circuit diagram illustrating a phase-invariant variable-gain low-noise amplifier (PI-VGLNA) in accordance with several embodiments of the invention.
FIG. 4B is a circuit diagram illustrating a programmable gain amplifier/variable gain amplifier (PGA/VGA) in accordance with several embodiments of the invention.

To achieve high dynamic range, the AFE may require a wide gain tuning range and low phase error. Architectures that may be utilized for the PI-VGLNA and PGA/VGA in accordance with embodiments of the invention are shown in FIG. 4A and FIG. 4B respectively. An LNA (low noise amplifier) with current-steering cascode architecture can be chosen to stabilize the phase response of the amplifier. Moreover, the phase invariant response can be improved by inserting inductors $L_1$ and $L_2$ between common source and common gain stages. These inductors not only enhance input-output isolation, but they also reduce the sensitivity of phase variation. PGA/VGA can also be implemented in a current-steering structure controlled by single-to-differential V/I converters. Two flying capacitors, $C_1$ and $C_2$, may be used to introduce a frequency zero to compensate the phase shift at 4.75 GHz. Although specific architectures are described above with respect to FIGS. 4A and 4B, one skilled in the art will recognize that any of a variety of architectures may be utilized in accordance with embodiments of the invention. Different components may be used to similar effect as discussed here.

Coarse ToF Detector

Figure 5:
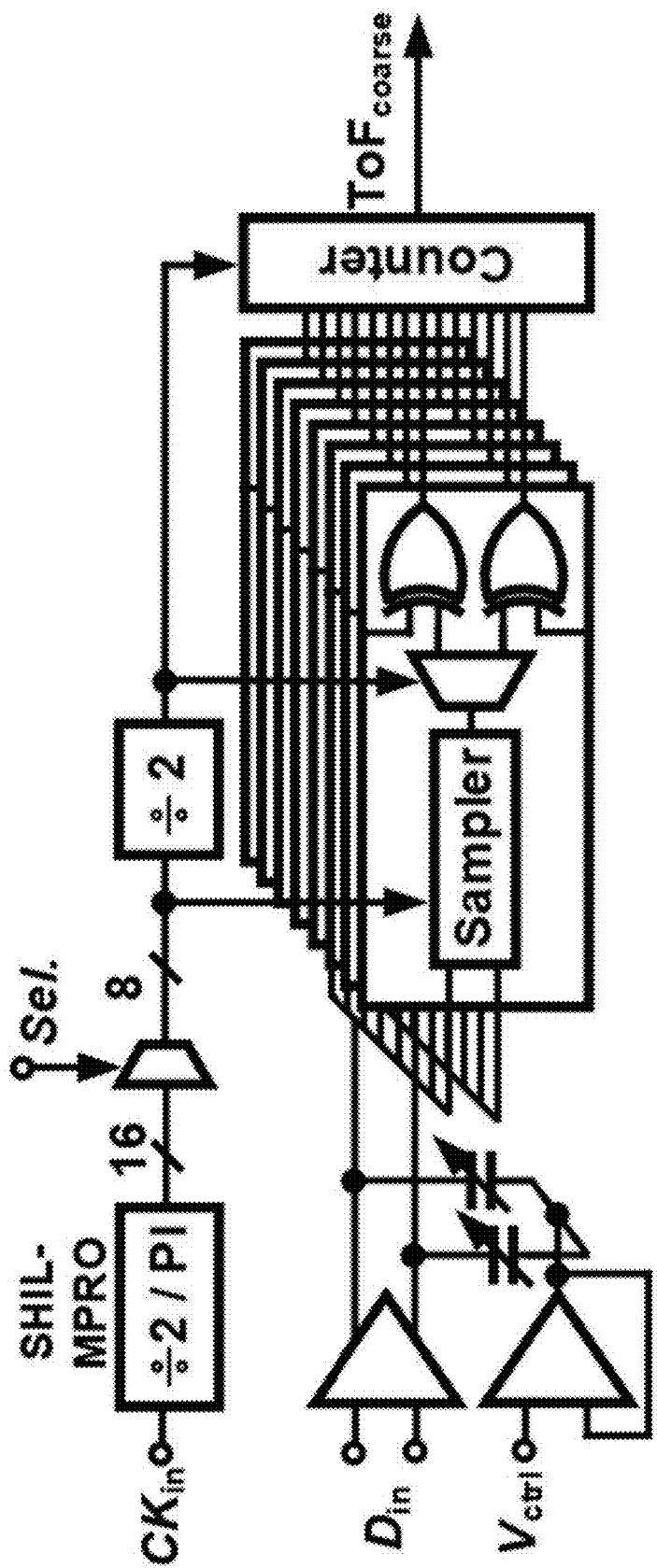
FIG. 5 is a circuit diagram illustrating a coarse time of flight (ToF) detector in accordance with several embodiments of the invention.
Figure 6:
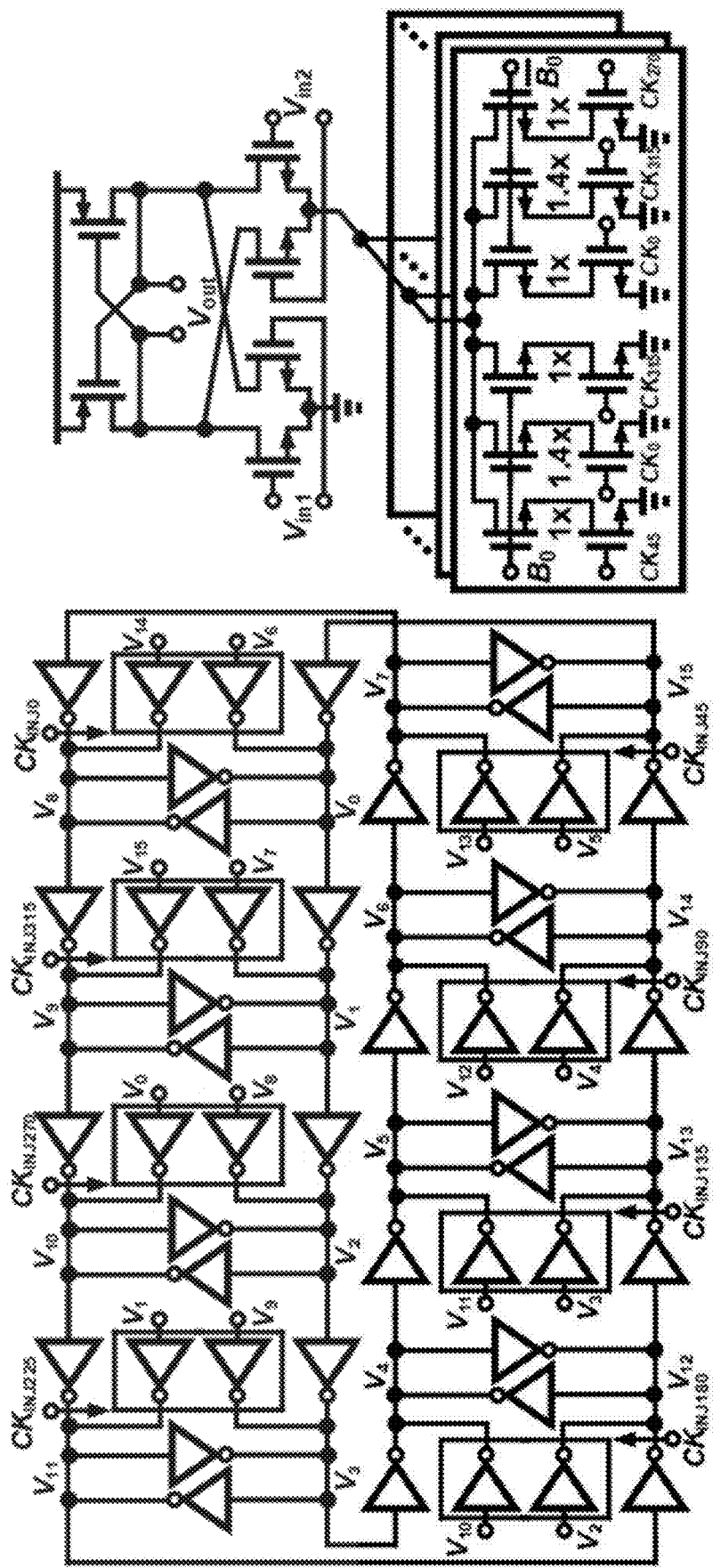
FIG. 6 is a circuit diagram illustrating a superharmonic injection locked multipath ring oscillator (SHIL-MPRO) providing 8-way interleaving clock phases in accordance with several embodiments of the invention.

A coarse ToF detector in accordance with several embodiments of the invention is shown in FIG. 5. The output of the power detector is filtered by a low-pass filter prior to counting. Since the AGC loop may have a small amount of input-dependent gain error, the filter has a small degree of adjustability to compensate for the phase shift that results. Varactors may be adjusted according to the $V_{ctrl}$ of the AGC loop as a signal strength indicator to adjust the transition time. The filter is followed by 8-way time-interleaved samplers, an 8-to-16 demultiplexer, and XOR gates to accurately detect the transition time at low rates. The 8-way interleaving clock phases can be provided by an SHIL-MPRO. The design, shown in FIG. 6, can be enhanced with an embedded harmonic-rejection phase interpolation in each stage to allow all phases to be shifted with a control code. The phase selector (Sel.) in FIG. 5 can then select in-phase or quadrature-phase based on the relation between I/O fine measurement to effectively double the sampling rate of the detector. This approach reduces the routing complexity of clock signals. Although specific architectures are described above with respect to FIGS. 5 and 6, one skilled in the art will recognize that any of a variety of architectures may be utilized in accordance with embodiments of the invention. Different components may be used to similar effect as discussed here.

Experimental Results

Figure 7:
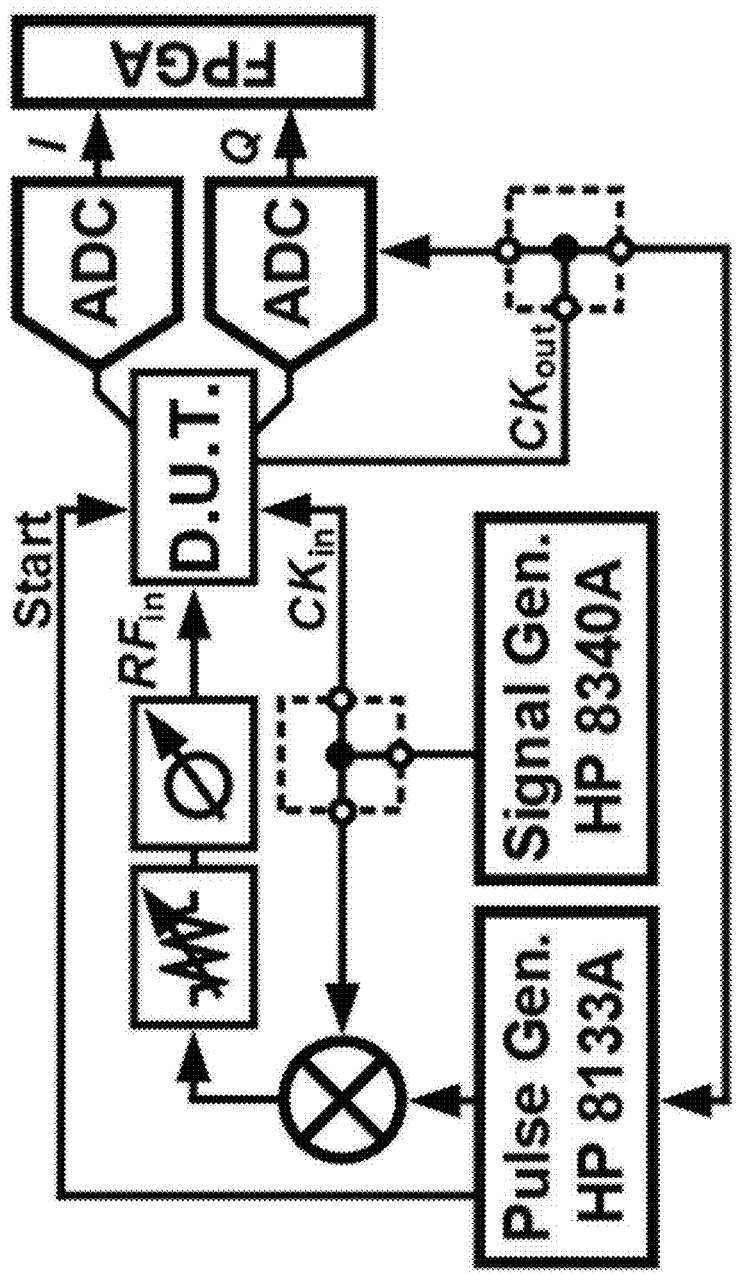
FIG. 7 is a circuit diagram illustrating a measurement system for receivers in accordance with embodiments of the invention.

A pulsed-coherent detector in accordance with an embodiment of the invention has been designed and fabricated in 28-nm CMOS technology. The receiver consumes 121 mA from 1-V supply. A measurement setup is illustrated in FIG. 7. The performance results presented here are prior to integration with the optical components and hence use the electrical interface. The transmitter is built by a synthesizer, a pulse generator and an up-conversion mixer to generate pulse-modulated signals. The receiver performance was characterized by tuning an attenuator and a phase shifter in the signal path. An off-chip ADC captures the outputs from coherent detection or direct samples from 4.75-GHz signals for characterizing the response of AGC loop.

Figure 8:
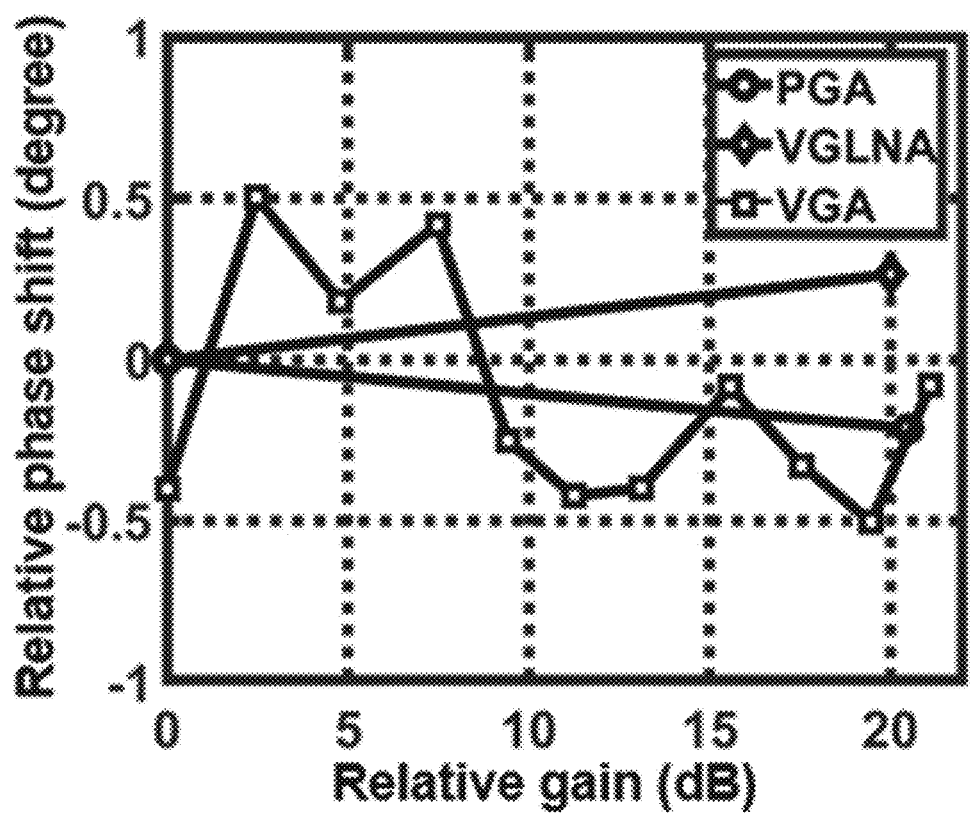
FIG. 8 graphically illustrates example measurement results of a phase-invariant AFE.
Figure 9A:
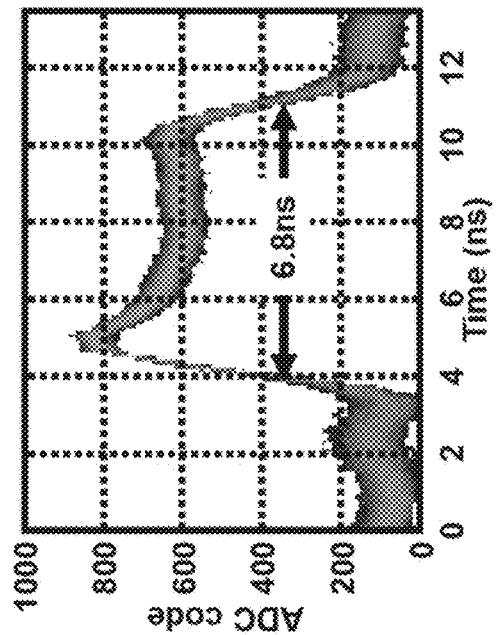
FIGS. 9A and 9B graphically illustrate an AGC loop characteristic in certain situations.
Figure 9B:
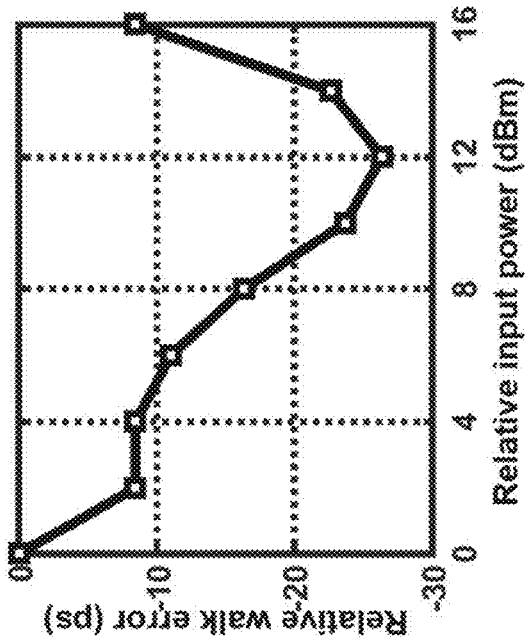
Figure 9C:
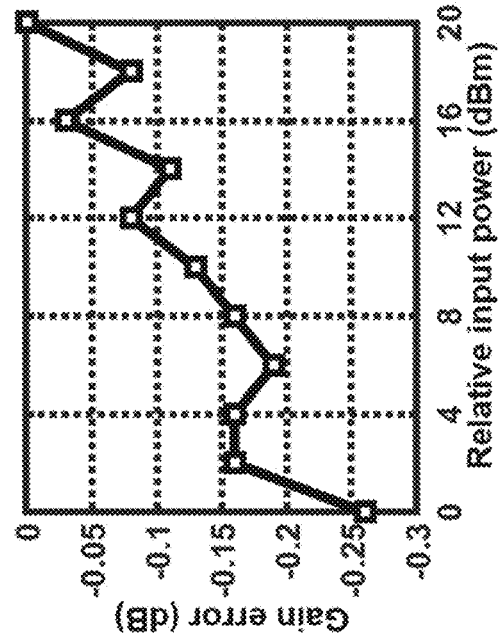
FIGS. 9C and 9D compare walk error in certain situations.
Figure 9D:
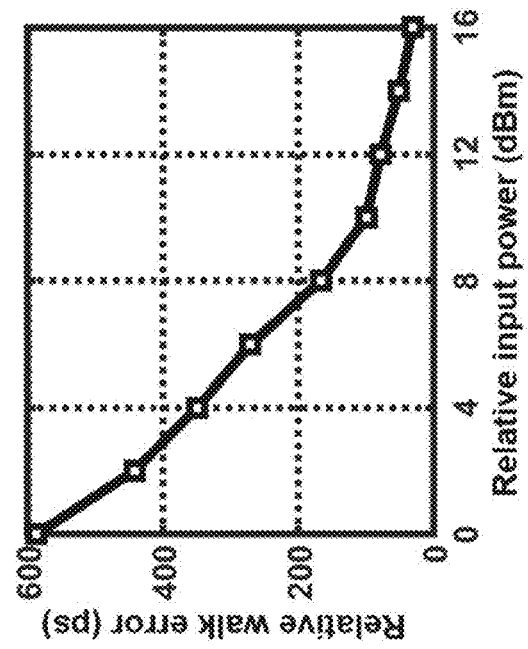

FIG. 8 shows the measurement results of the phase-invariant AFE. The phase error across 20-dB tuning range is ±0.14° of PI-VGLNA, ±0.11° of PGA, and ±0.5° of VGA, which corresponds to ±16.5 μm resolution accuracy. FIGS. 9A and 9B depict the AGC loop characteristic. Loop gain error of 20-dB input power difference is shown in FIG. 9A, the gain error is within 0.3 dB. The transient response of received pulsed modulated waveform is captured and shown in FIG. 9B with setting time less than 4 ns. FIG. 9C and FIG. 9D compare the walk error between rising edge detection and the proposed falling edge detection with different received input powers. The relative input power is referenced to the minimum detectable SNR of 12 dB before the signal detector. For a single-threshold rising-edge detection, the walk error across 16-dB dynamic range can be as large as 600 ps (FIG. 9C). The proposed post-edge detection reduces the walk error to 26 ps (FIG. 9D). With the error less than one cycle, the coherent detection results are used and the error no longer impacts the accuracy of the measured ToF.

Figures 10A, 10B:
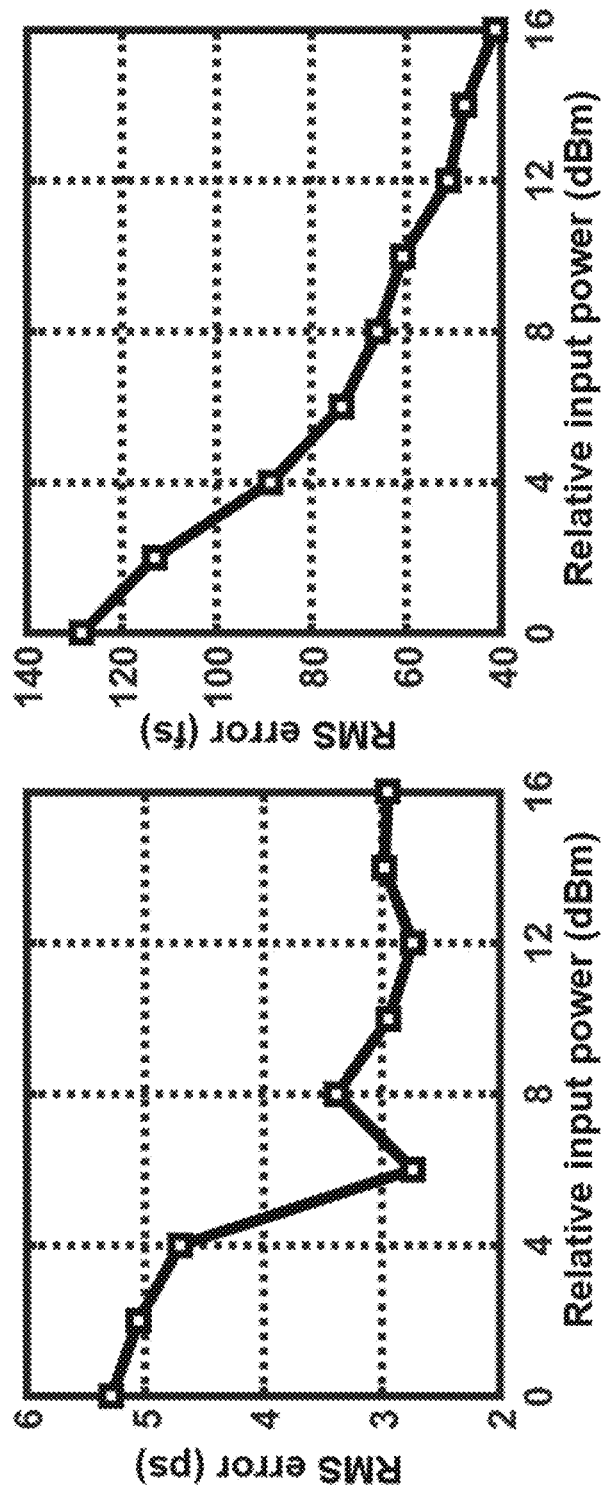
FIG. 10A graphically illustrates rms error of a coarse ToF measurement in certain situations.
FIG. 10B graphically illustrates rms error of a fine ToF measurement in certain situations.

FIG. 10A depicts the rms error (Ge) of the coarse ToF readouts with 70 detected post-edges, which can be given as equation (2) below:

$$\sigma_e = \frac{\sigma}{\sqrt{N}} \quad (2)$$

Figure 11:
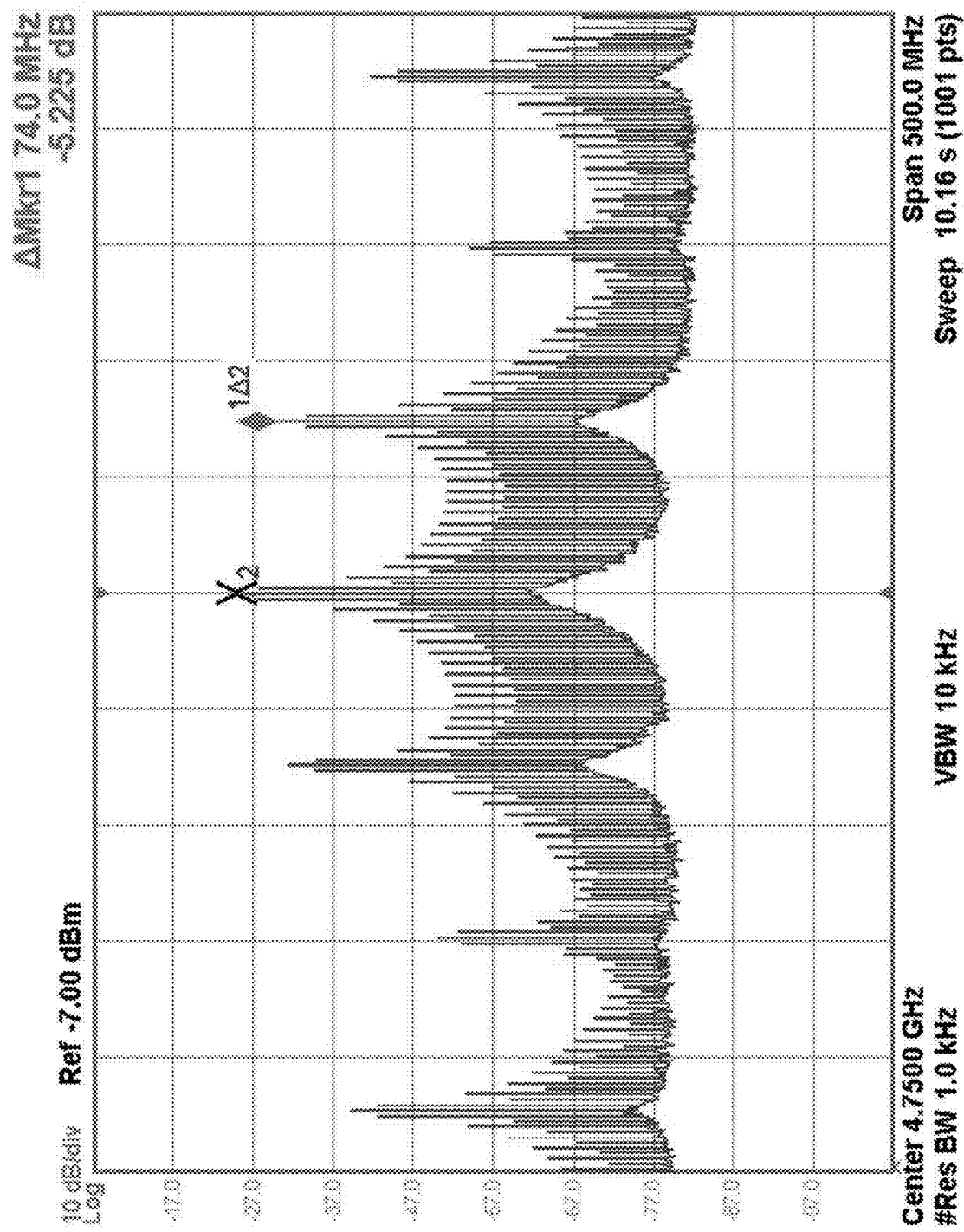
FIG. 11 graphically illustrates an example spectrum of a received pulse sequence at the VGA's output in accordance with an embodiment of the invention.
Figure 12:
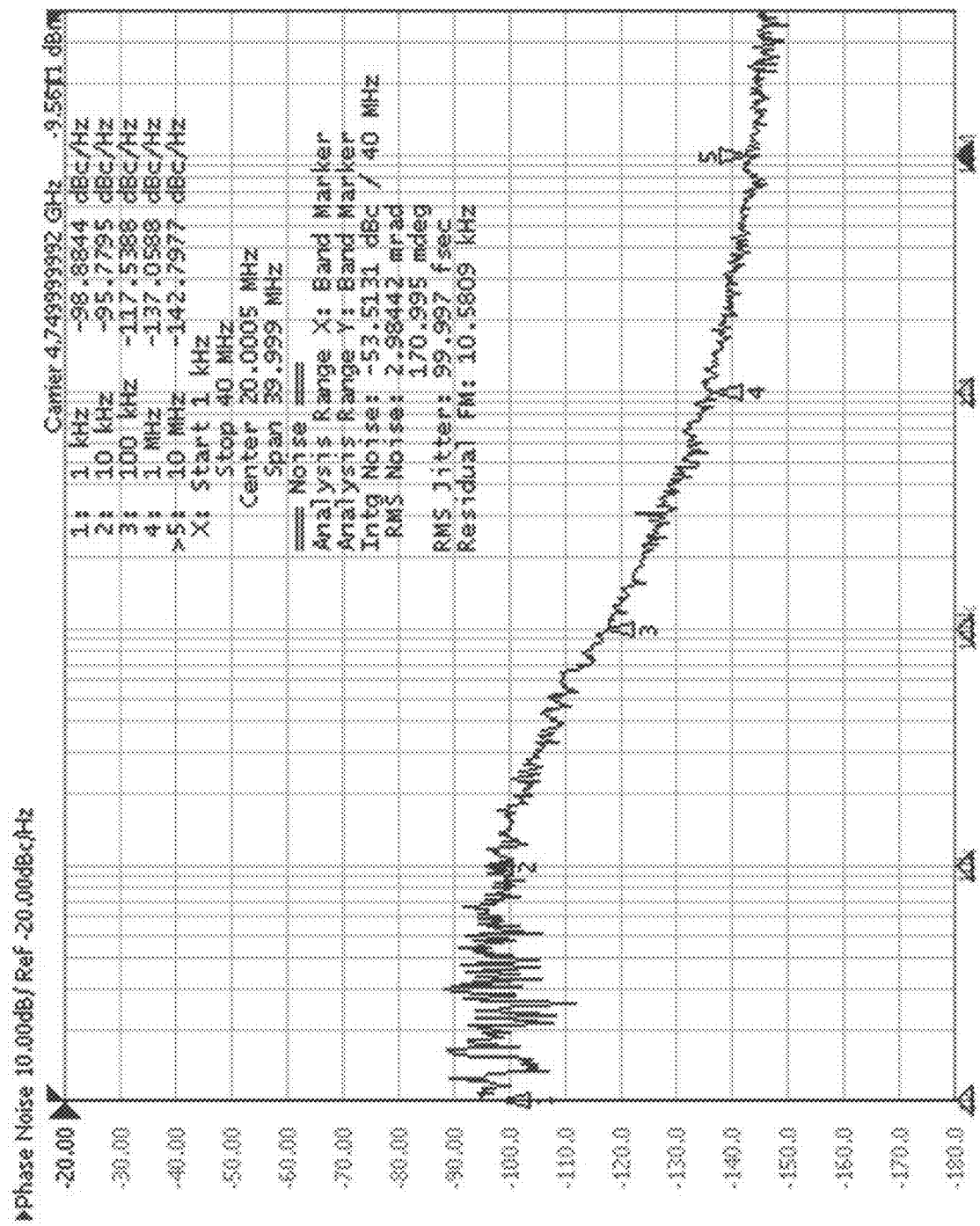
FIG. 12 graphically illustrates phase noise of a 4.75-GHz clock for coherent measurement in accordance with an embodiment of the invention.

The rms error of the fine ToF measurement is shown in FIG. 10B. With 1-μs integration time (N=140), the rms error is 130 fs with an SNR of 12 dB and 42 fs with high SNR. The corresponding precision is 19.5 μm and 6.3 μm respectively. Combining the rms error and the phase offset due to the VGAs, the precision of 40 μm can be achieved based on the timing accuracy. FIG. 11 shows the spectrum of the received pulse sequence at the VGA's output, and FIG. 12 shows the phase noise of 4.75-GHz clock for coherent measurement. The rms jitter integrated from 1 kHz to 40 MHz is 100 fs. Table I summarizes the performance detectors in accordance with several embodiments of the invention.

This design presents a detection architecture using pulsed-coherent coarse-fine ToF measurement that combines the benefits of pulsed detection and coherent detection in a segmented converter design. Post-edge envelope detection reduces the sensitivity to walk error so that the pulsed detection is sufficiently accurate as the coarse measurement for the fine coherent detection. The fast settling AGC loop enhances the sampling rate, and the phase-invariant variable gain analog front-end improves the precision. This ToF receiver can theoretical achieve 40-μm resolution with 1-MHz sampling rate.

Processes for Measuring Distance Using Both Coherent and Pulsed ToF Detection

Figure 13:
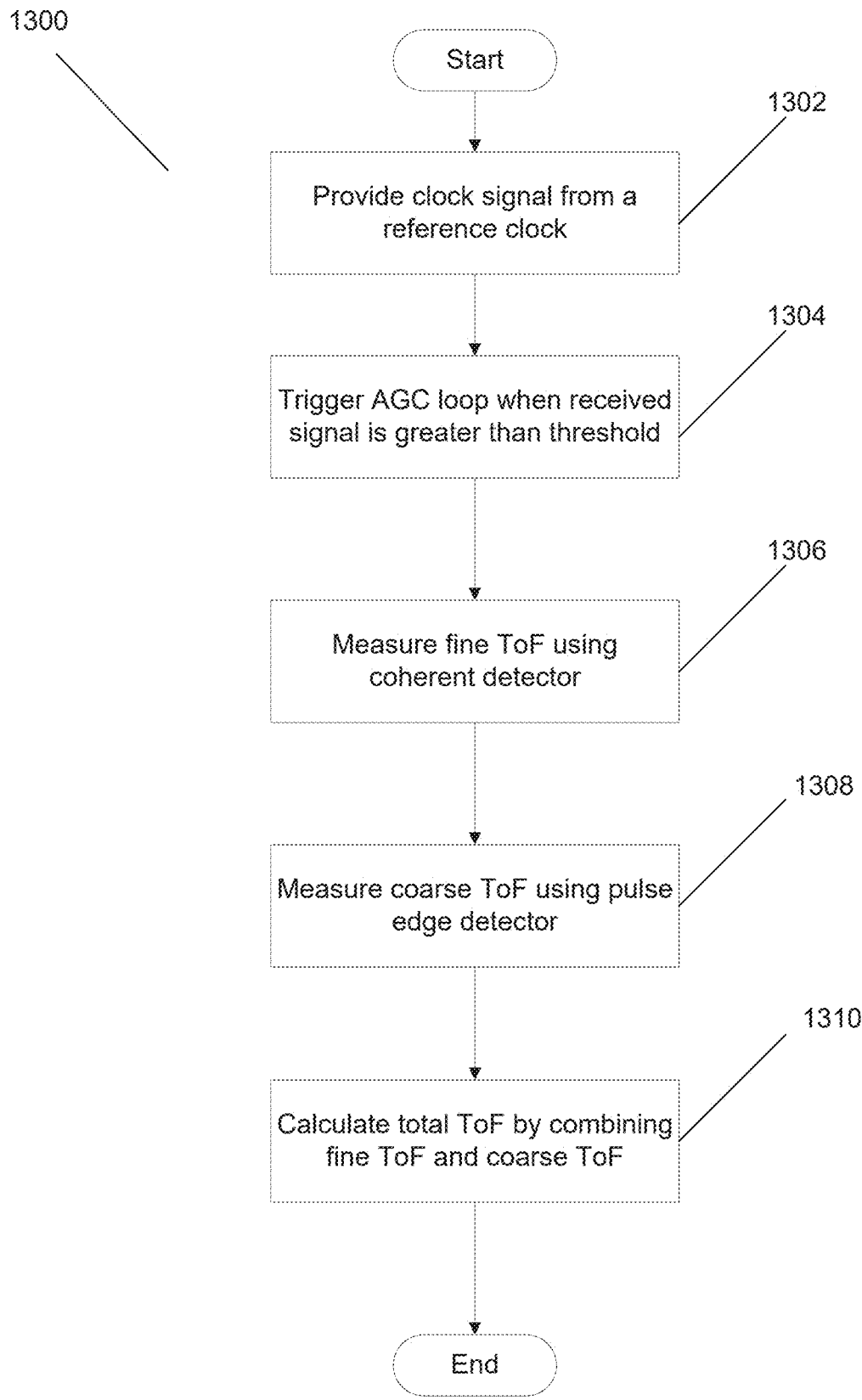
FIG. 13 illustrates a process for measuring distance using both coherent and pulsed ToF detection in accordance with an embodiment of the invention.

Processes for measuring distance with a light detection and ranging (lidar) system utilizing both coherent and pulsed detection for Time of Flight (ToF) in accordance with embodiments of the invention may utilize hardware such as those described further above. A process 1300 for measuring distance using a lidar system in accordance with several embodiments of the invention is shown in FIG. 13.

The process 1300 includes providing or receiving (1302) a clock signal ($CK_{ref}$) with time period $T_{clk}$ from a reference clock. An automatic gain control (AGC) loop is triggered (1304) when a received signal $RF_{in}$ is greater than a threshold voltage $V_{th}$. The process includes measuring (1306) a fine ToF using a coherent detector by detecting the phase difference ($\Delta\phi$) between the clock signal ($CK_{ref}$) and the received signal ($RF_{in}$). The process also measures (1308) a coarse ToF using a pulse edge detector by detecting a falling edge (post-edge) of the received signal ($RF_{in}$) and counting cycles N to estimate an arrival time of $N \times T_{clk}$. The total ToF is calculated (1310) by combining output of the coherent detector (fine ToF) and pulse edge detector (coarse ToF), such as by using the equation:

$$ToF = \left[N + \left(\frac{\Delta\Phi}{2\pi}\right)\right] \times T_{clk}.$$

Although a specific process is described above with respect to FIG. 13, one skilled in the art will recognize that any of a variety of processes may be utilized for ToF measurement including coherent and pulsed detection in accordance with embodiments of the invention.

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. A light detection and ranging (lidar) system utilizing both coherent and pulsed detection for Time of Flight (ToF) measurement, comprising:
    a reference clock providing a clock signal ($CK_{ref}$) with time period $T_{clk}$;
    an automatic gain control (AGC) loop that is triggered when a received signal $RF_{in}$ is greater than a threshold voltage $V_{th}$;
    a coherent detector configured to measure a fine ToF by detecting the phase difference ($\Delta\phi$) between the clock signal ($CK_{ref}$) and the received signal ($RF_{in}$);
    a pulse edge detector configured to measure a coarse ToF by detecting a falling edge (post-edge) of the received signal ($RF_{in}$) and counting cycles N to estimate an arrival time of $N \times T_{clk}$; and
    a combiner configured to calculate total ToF by combining output of the coherent detector and pulse edge detector using the equation:

$$ToF = \left[N + \left(\frac{\Delta\Phi}{2\pi}\right)\right] \times T_{clk}.$$

2. The lidar system of claim 1, wherein the AGC loop comprises a folded-cascode amplifier as a V/I converter.

3. The lidar system of claim 1, wherein the coherent detector comprises two single-side band (SSB) mixers.

4. The lidar system of claim 1, further comprising a variable gain analog front-end to control amplitude of the received signal ($RF_{in}$).

5. The lidar system of claim 4, wherein the variable gain analog front-end comprises a phase-invariant variable-gain low-noise amplifier (PI-VGLNA), in-phase and quadrature phase (I/Q) down-conversion mixer, programmable gain amplifier (PGA) and variable gain amplifier (VGA).

6. The lidar system of claim 5, wherein the PI-VGLNA comprises a current-steering cascode architecture with inductors between common source and common gain stages.

7. The lidar system of claim 5, wherein the PGA and VGA comprise current-steering structures controlled by single-to-differential V/I converters.

8. The lidar system of claim 1, wherein the pulse edge detector comprises varactors adjusted according to voltage $V_{ctrl}$ of the AGC loop, 8-way time-interleaved samplers, an 8-to-16 demultiplexer, and XOR gates.

9. A method for measuring distance with a light detection and ranging (lidar) system utilizing both coherent and pulsed detection for Time of Flight (ToF), the method comprising:
  providing a clock signal ($CK_{ref}$) with time period $T_{clk}$ from a reference clock;
  triggering an automatic gain control (AGC) loop when a received signal $RF_{in}$ is greater than a threshold voltage $V_{th}$;
  measuring a fine ToF using a coherent detector by detecting the phase difference ($\Delta\phi$) between the clock signal ($CK_{ref}$) and the received signal ($RF_{in}$);
  measuring a coarse ToF using a pulse edge detector by detecting a falling edge (post-edge) of the received signal ($RF_{in}$) and counting cycles N to estimate an arrival time of $N \times T_{clk}$; and
  calculating total ToF by combining output of the coherent detector and pulse edge detector using the equation:

$$ToF = \left[N + \left(\frac{\Delta\Phi}{2\pi}\right)\right] \times T_{clk}.$$

10. The method of claim 9, wherein the AGC loop comprises a folded-cascode amplifier as a V/I converter.

11. The method of claim 9, wherein the coherent detector comprises two single-side band (SSB) mixers.

12. The method of claim 9, further comprising controlling amplitude of the received signal ($RF_{in}$) using a variable gain analog front-end.

13. The method of claim 12, wherein the variable gain analog front-end comprises a phase-invariant variable-gain low-noise amplifier (PI-VGLNA), in-phase and quadrature phase (I/Q) down-conversion mixer, programmable gain amplifier (PGA) and variable gain amplifier (VGA).

14. The method of claim 13, wherein the PI-VGLNA comprises a current-steering cascode architecture with inductors between common source and common gain stages.

15. The method of claim 13, wherein the PGA and VGA comprise current-steering structures controlled by single-to-differential V/I converters.

16. The method of claim 9, wherein the pulse edge detector comprises varactors adjusted according to voltage $V_{ctrl}$ of the AGC loop, 8-way time-interleaved samplers, an 8-to-16 demultiplexer, and XOR gates.

* * * * *